F. W. HARRIS.
CONTROLLER FOR ELECTRIC MOTORS.
APPLICATION FILED SEPT. 26, 1910.
1,124,732. Patented Jan. 12, 1915.
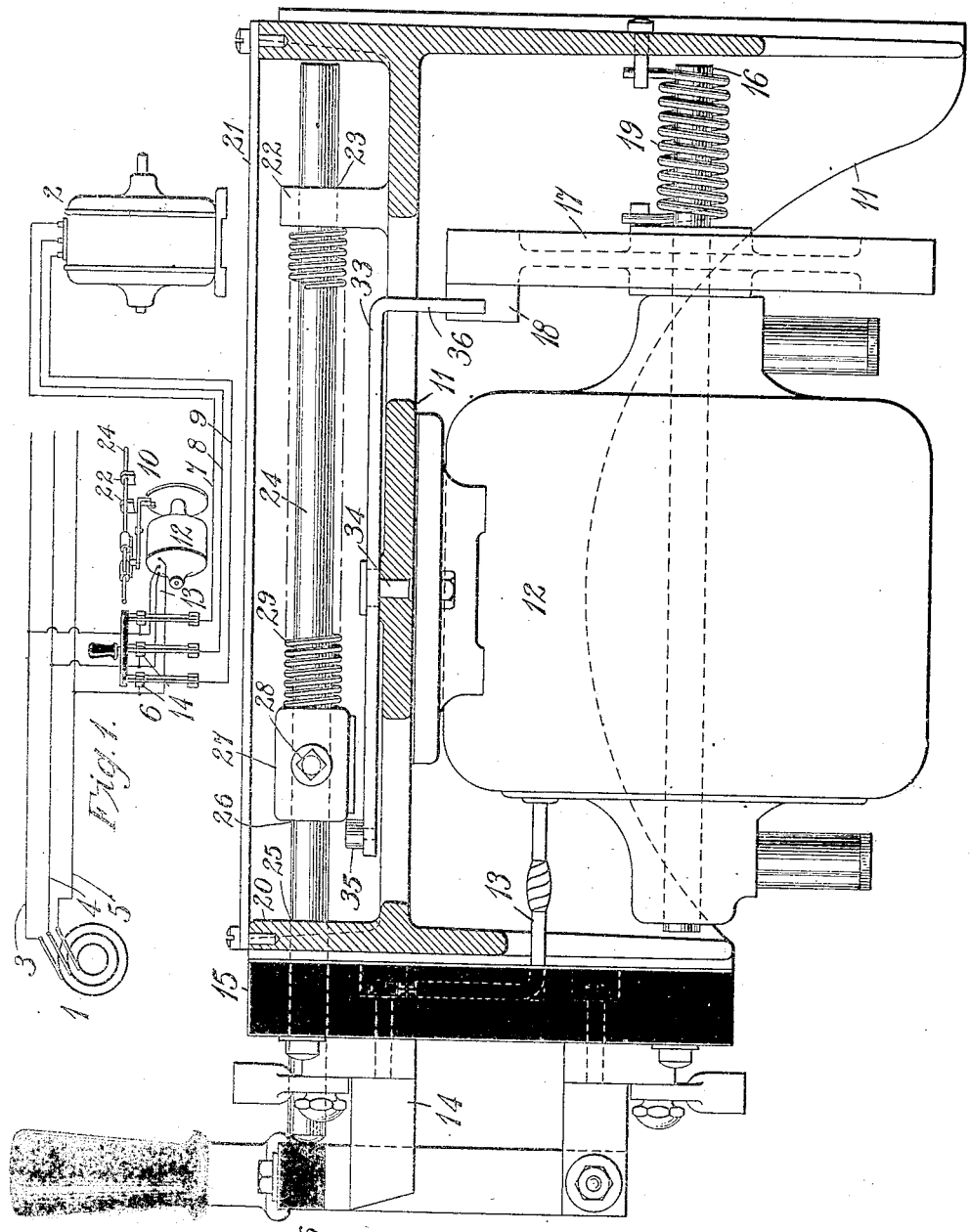

F. W. HARRIS.
CONTROLLER FOR ELECTRIC MOTORS.
APPLICATION FILED SEPT. 26, 1910.
1,124,732.
Patented Jan. 12, 1915.
2 SHEETS—SHEET 2.
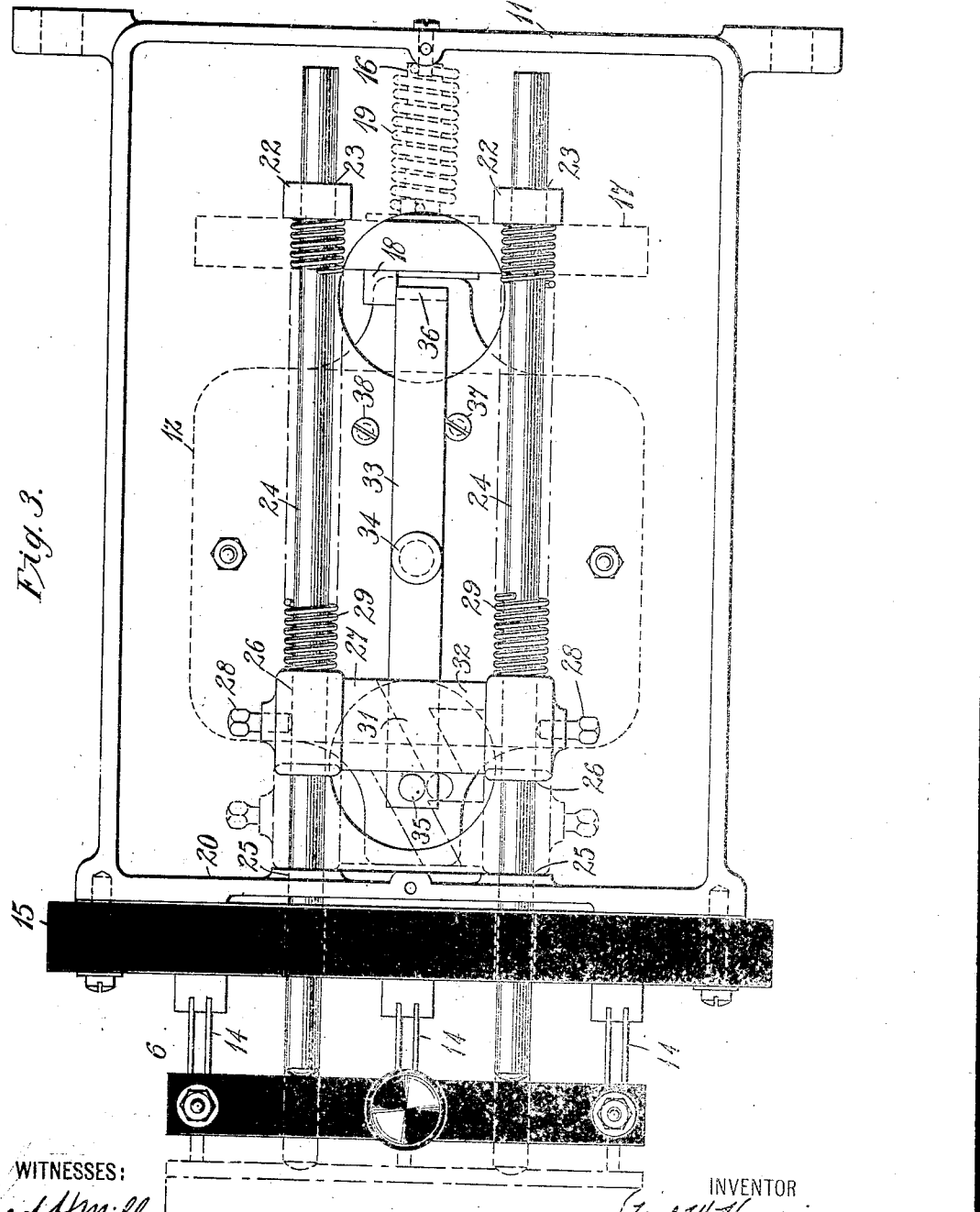

UNITED STATES PATENT OFFICE.

FORD W. HARRIS, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROLLER FOR ELECTRIC MOTORS.

1,124,732.

Specification of Letters Patent.   Patented Jan. 12, 1915.

Application filed September 26, 1910.   Serial No. 583,880.

*To all whom it may concern:*

Be it known that I, FORD W. HARRIS, a citizen of the United States, and a resident of Wilkinsburg, in the county of Allegheny and State of Pennsylvania, have invented a new and useful Improvement in Controllers for Electric Motors, of which the following is a specification.

My invention relates to controllers for electric motors and it has special reference to controllers for polyphase motors of the induction type.

The object of my invention is to provide a controller of the above indicated class that shall be adapted to automatically open the supply circuit of a polyphase motor on conditions of no voltage or phase reversal of the source of energy, and shall also embody means for preventing the closure of the motor line switch except when voltage exists upon the supply circuit and the phase rotation of said voltage is in the proper direction.

In the accompanying drawings, Figure 1 is a diagrammatic view of a system of distribution which embodies my invention. Fig. 2 is a view, partially in section and partially in side elevation, and Fig. 3 is a plan view of a device constructed in accordance with my invention.

Referring to the drawings, a three-phase alternating current generator 1 supplies energy to a polyphase induction motor 2, through line conductors 3, 4 and 5, a three-pole motor line switch 6, and motor line conductors 7, 8 and 9, said switch being provided with a controlling device 10 which embodies my invention.

The device 10 comprises a supporting frame 11, from which is suspended a small auxiliary polyphase induction motor 12, the leads 13 of which are connected to upper stationary contact terminals 14 of the switch 6. Switch 6 is mounted upon an insulating slab 15 which is suitably secured to the supporting frame 11.

The auxiliary induction motor 12 is provided with an extended shaft 16, to which is keyed a wheel 17, having a projection 18 located on its inner face and near its periphery. About the extended portion of the shaft 16 is disposed a coil spring 19, the opposite ends of which are respectively secured to the wheel 17 and the supporting frame 11. The motor 12 is so connected as to exert its torque in such direction, under normal operating conditions, as to store potential energy in the spring 19, as will be readily understood.

The supporting frame 11 is provided with an upwardly projecting flange 20, to support a cover-plate 21 and with posts or standards 22 having openings 23 to receive rods 24, similar openings 25 being also provided in the flange 20 to receive said rods. Openings 26 are also provided in the ends of a block 27 in which the rods 24 are clamped by means of set screws 28. A coil spring 29 surrounds each of the rods 24 between its standard 22 and the block 27. Under normal operating conditions the springs 29 are maintained under compression, as hereinafter explained.

In order to render the action of springs 29 dependent upon the operation of the auxiliary induction motor 12, the bottom side of the block 27 is provided with two communicating grooves 31 and 32, the former of which is materially inclined with reference to the axes of the rods 24, the latter of which is at right angles to said axes. A lever 33 is pivotally supported upon a pin 34, and is provided with a projection 35 at one end to engage and coöperate with the block 27 and its grooves 31 and 32. The opposite end 36 of the lever 33 projects downwardly to be engaged by the projection 18 of the wheel 17. Stops 37 and 38 are provided to restrict the movement of lever 33 in either direction.

Under normal circuit conditions, the circuit connections and the position of the various parts of the apparatus are as illustrated in the drawings. The torque of motor 12 is exerted against the action of spring 19 and, hence, the projection 18 of the wheel 17 engages the end 36 of the lever 33 and maintains said lever in contact with the stop 37. Projection 35, therefore, engages the side of the block 27 and maintains springs 29 in compression. If, for any reason whatsoever, the voltage of the supply circuit fails, the excitation of the motor 12 is interrupted, and its torque, which tends to hold the projection 18 against the lever extension 36, is discontinued. Therefore, the spring 19 turns the wheel 17 in the opposite direction until the projection 18 engages the other side of the end 36 of lever 33 and forces the lever against the stop 38. Under these conditions, the projection 35 is moved into position to engage the groove 31. It is evident, therefore, that the springs 29 are now free to force the rods 24 against the movable member of the switch 6 and move it to open position. During this operation, the projection 35 passes through the groove 31 and into the groove 32, as indicated in Fig. 3 by the dot and dash lines. If, instead of a failure of the supply voltage, a reversal of one of its phases occurs, it is evident that the direction of rotation of motor 12 is likewise reversed, according to well known principles. The torque of the motor, therefore, assists the action of spring 19 in causing reverse rotation of the wheel 17 and the engagement of the projection 18 with the lever 33, to release the block 27 and cause the interruption of the supply circuit, as hereinbefore explained.

Assuming that switch 6 is open and the switch-actuating mechanism occupies the position shown in Fig. 3, by dot and dash lines, the subsequent closure of said switch is as follows: It is evident that, since the rods 24 are in their extreme outward positions and are held in said positions by reason of the engagement of the projection 35 with the side of the groove 32 the switch can not be closed. However, if voltage is restored to the supply circuit and the phase rotation is in the proper direction, motor 12 is caused to operate against the torsional effort of spring 19 to force lever 33 against the stop 37. In this position, projection 35 is moved into the groove 31. Under these conditions the switch 6 may be closed, by forcing in the rods 24 against the action of the springs 29. The motor 12 continues to exert its torque in the same direction and, therefore, when the projection 35 has passed through the groove 31, it is moved into its original position, to hold springs 29 under compression.

Although I have shown and described the controlling device of my invention as applied to a common type of line switch, those skilled in the art will readily understand that any form of switch or circuit interrupter may be employed. Furthermore, I desire it to be understood that many modifications of structural details and arrangement and location of parts may be effected within the scope of my invention and that only such limitations shall be imposed as are indicated in the appended claims.

I claim as my invention:

1. The combination with a polyphase supply circuit, and a circuit-interrupting switch, of a spring-actuated means for opening or preventing closure of said switch, a locking mechanism to restrain said spring-actuated means in either of its extreme positions, and electro-responsive means dependent upon predetermined conditions of voltage or phase rotation of the supply circuit for governing the action of said locking mechanism.

2. The combination with a polyphase supply circuit, and a circuit interrupting switch, of a mechanically actuated rod tending to open said switch, means for restraining said rod in its extreme positions, means dependent upon failure of the supply circuit voltage or reversal of phase rotation for releasing the rod and opening said switch, said last named means being adapted to prevent subsequent closure of said switch except under predetermined conditions of voltage and phase rotation.

3. The combination with a circuit interrupting device, of a spring-actuated means for opening the interrupting device, means for locking said spring-actuated means in position to prevent circuit-closing movement of said device, and electro-responsive means for releasing said spring-actuated means from said locking means upon the occurrence of predetermined conditions of voltage and phase rotation of a polyphase source of energy.

4. A circuit interrupting device comprising a switch, mechanical means to open or prevent closure of said switch, a locking mechanism adapted to cause said mechanical means to open or prevent closure of said switch, and a polyphase induction motor tending, under normal operating conditions, to rotate in one direction, and adapted under predetermined conditions to rotate in a reverse direction to actuate said locking mechanism.

5. The combination with a polyphase alternating current supply circuit, and a circuit-interrupting switch, of positively locked mechanical means for opening and for preventing the closure of said switch, and electro-responsive means for unlocking said mechanical means in each of its locked positions under predetermined conditions of voltage and direction of phase rotation of said supply circuit.

6. The combination with a polyphase alternating current supply circuit, and a circuit-interrupting device, of normally locked mechanical means for opening said device and for holding the same open, and an asynchronous motor connected to said supply circuit for unlocking said mechanical means to permit the said device to be closed under predetermined conditions of voltage and phase rotation.

7. The combination with a polyphase alternating current supply circuit, a circuit interrupter, and an opening device that is positively locked in each of its extreme positions, of electro-responsive means for unlocking said device under predetermined conditions of voltage and direction of phase rotation of said supply circuit.

8. The combination with a polyphase alternating current supply circuit, a circuit-interrupting switch, and a switch-opening means, of a locking device, and a controlling means connected to said supply circuit and serving to actuate the locking device to hold the switch-opening means inactive under normal operating conditions, and to actuate said device to release said switch-opening means upon a reversal of phase rotation or interruption of said supply circuit voltage, said controlling means also serving to actuate said locking device to hold the switch opening means in position to prevent closure of the switch until normal operating conditions are restored in the supply circuit.

In testimony whereof, I have hereunto subscribed my name this 17th day of Sept., 1910.

FORD W. HARRIS.

Witnesses:
WILSON L. WRIGHT,
B. B. HINES.